US012645313B2

(12) United States Patent (10) Patent No.: US 12,645,313 B2
Hong et al. (45) Date of Patent: Jun. 2, 2026

(54) CONTROLLER APPARATUS AND CONTROLLER APPARATUS CONTROL METHOD

(71) Applicant: Sony Interactive Entertainment Inc., Tokyo (JP)

(72) Inventors: Sulgi Hong, Tokyo (JP); Takayuki Katsuma, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/863,334

(22) PCT Filed: May 13, 2022

(86) PCT No.: PCT/JP2022/020287
§ 371 (c)(1),
(2) Date: Nov. 6, 2024

(87) PCT Pub. No.: WO2023/218669
PCT Pub. Date: Nov. 16, 2023

(65) Prior Publication Data
US 2025/0315116 A1 Oct. 9, 2025

(51) Int. Cl.
*A63F 13/211* (2014.01)
*G06F 3/01* (2006.01)
(Continued)

(52) U.S. Cl.
CPC .......... *G06F 3/0383* (2013.01); *A63F 13/211* (2014.09); *G06F 3/016* (2013.01);
(Continued)

(58) Field of Classification Search
CPC ...... G06F 3/0383; G06F 3/016; G06F 3/0338; G06F 2203/013; G06F 2203/015; A63F 13/211
See application file for complete search history.

(56) References Cited

U.S. PATENT DOCUMENTS 11,372,412 B1 * 6/2022 Yamaguchi ............ B63H 20/12
2005/0259075 A1 * 11/2005 Ishikawa .................. G05G 5/03
345/161
(Continued)

FOREIGN PATENT DOCUMENTS

EP 3614558 A1 2/2020
EP 3916996 A1 12/2021
(Continued)

OTHER PUBLICATIONS

International Search Report and Written Opinion mailed on Aug. 2, 2022, received for International Application No. PCT/JP2022/020287, filed on May 13, 2022, 8 pages including English Translation.

*Primary Examiner* — Afroza Chowdhury
(74) *Attorney, Agent, or Firm* — Fish & Richardson P.C.

(57) ABSTRACT

Disclosed is a controller apparatus that includes an operating member and a drive section. The operating member is tilt operable. The drive section drives the operating member. The controller apparatus receives, from an information processing apparatus, an input of instruction information indicating the drive direction and drive angle of the operating member to be driven by the drive section. The controller apparatus then acquires information indicating the tilt angle of the operating member, calculates a differential value of the tilt angle, corrects a control signal based on the instruction information according to the calculated differential value of the tilt angle of the operating member, and controls the drive section according to the corrected control signal.

20 Claims, 4 Drawing Sheets

(51) Int. Cl.
   *G06F 3/0338* (2013.01)
   *G06F 3/038* (2013.01)

(52) U.S. Cl.
   CPC ...... *G06F 3/0338* (2013.01); *G06F 2203/013* (2013.01); *G06F 2203/015* (2013.01)

(56) References Cited

U.S. PATENT DOCUMENTS

| | | | | |
|---|---|---|---|---|
| 2007/0008283 | A1 | 1/2007 | Ouchi | |
| 2010/0211345 | A1* | 8/2010 | Von Zon ................ | G01D 5/147 |
| | | | | 702/94 |
| 2014/0368796 | A1* | 12/2014 | Ogura .................. | A61B 3/0075 |
| | | | | 351/245 |
| 2016/0357272 | A1* | 12/2016 | Kumahara ............ | G06F 3/0383 |
| 2021/0002867 | A1* | 1/2021 | Muraoka .............. | E02F 9/2285 |

FOREIGN PATENT DOCUMENTS

| | | | |
|---|---|---|---|
| JP | 2005-332039 | A | 12/2005 |
| JP | 2006-344038 | A | 12/2006 |
| JP | 2008-217470 | A | 9/2008 |
| JP | 2015-215730 | A | 12/2015 |

* cited by examiner

2 : INFORMATION PROCESSING APPARATUS

1 : CONTROLLER APPARATUS

CONTROLLER APPARATUS AND CONTROLLER APPARATUS CONTROL METHOD

CROSS-REFERENCE TO RELATED APPLICATION

This application is a national stage application, pursuant to 35 U.S.C. § 371, of International Patent Application No. PCT/JP2022/020287, filed May 13, 2022, the entire contents of which are incorporated herein by reference.

TECHNICAL FIELD

The present invention relates to a controller apparatus and a controller apparatus control method.

BACKGROUND ART

Controller apparatuses equipped with operating members that are tilt operable are used as input devices for many information processing apparatuses, such as home video game consoles. In some cases, actuators are used to control a tilt angle and a tilt direction of the operating members in order to present a sense of force to users of the controller apparatuses.

In the past, when the actuators are used to control the operating members in such cases, for example, the controller apparatuses detect the tilt angle of the operating members, and then the information processing apparatuses receive information regarding the detected tilt angle from the controller apparatuses, and issue instructions, such as instructions on a control current, in order to ensure that the detected angle becomes a target tilt angle.

SUMMARY

Technical Problem

However, in the configuration in the past in which the information regarding the tilt angle detected by the controller apparatuses is transmitted to the information processing apparatuses that determine the instructions, such as the instructions on the control current, the transmission of such information is unavoidably delayed. Therefore, at the time of determination of the instructions, such as the instructions on the control current, the actual tilt angle differs from the detected tilt angle. As a result, the actual tilt angle may exceed the target tilt angle, making it difficult to provide stable drive control of the operating members.

The present invention has been made in view of the above circumstances. An object of the present invention is to provide a controller apparatus and a controller apparatus control method that are able to provide stable drive control of operating members.

Solution to Problem

In order to solve the above problem in the past, according to an aspect of the present invention, there is provided a controller apparatus that is to be connected to an information processing apparatus. The controller apparatus includes an operating member, a drive section, a reception circuit, and a control circuit. The operating member is tilt operable. The drive section drives the operating member. The reception circuit receives, from the information processing apparatus, an input of instruction information indicating the drive direction and drive angle of the operating member to be driven by the drive section. The control circuit controls the drive section in accordance with the instruction information received by the reception circuit. The control circuit acquires information indicating a tilt angle of the operating member, calculates a differential value of the tilt angle, corrects a control signal based on the instruction information according to the calculated differential value of the tilt angle of the operating member, and controls the drive section according to the corrected control signal.

Advantageous Effect of the Invention

The present invention makes it possible to provide stable drive control of operating members.

DESCRIPTION OF EMBODIMENT

Figure 1:
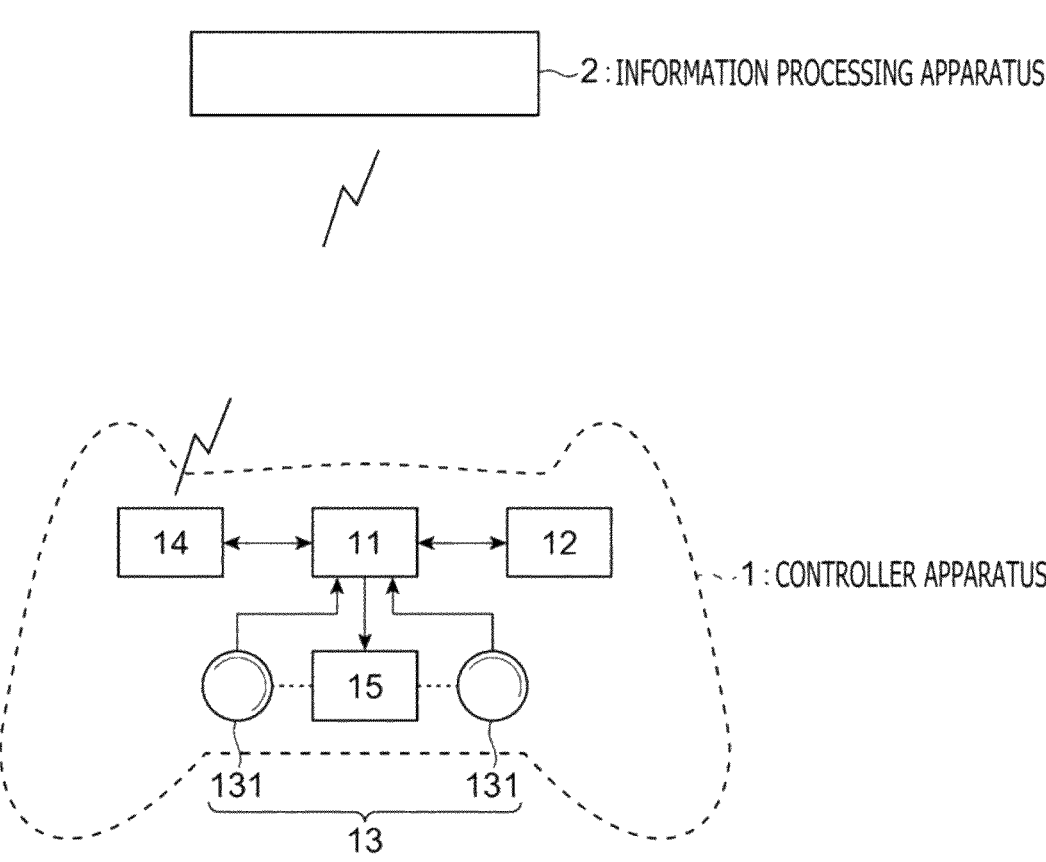
FIG. 1 is a block diagram illustrating an example of a configuration of a controller apparatus according to an embodiment of the present invention.

An embodiment of the present invention will now be described with reference to the accompanying drawings. Incidentally, in the following description, for example, the size and ratio of each section are merely illustrative and not restrictive. For example, different sizes and ratios are acceptable. As illustrated in FIG. 1, a controller apparatus 1 according to an embodiment of the present invention includes a control section 11, a storage section 12, an operation section 13, a communication section 14, and a drive section 15. Further, the controller apparatus 1 is communicatively connected to an information processing apparatus 2.

Here, the information processing apparatus 2 is, for example, a home video game console or a personal computer, and configured to receive information indicating user operations performed on the controller apparatus 1 and perform predetermined information processing, such as game processing. Further, in the present embodiment, the information processing apparatus 2 transmits control instructions to the controller apparatus 1 for a purpose of controlling the drive section 15 during, for example, the game processing. The contents of the control instructions transmitted in the above instance will be described later.

The control section 11 of the controller apparatus 1 is a program-controlled device such as a microcomputer and operates in accordance with a program stored in the storage section 12. In an example of the present embodiment, the control section 11 transmits information indicating a user operation performed on the operation section 13 to the information processing apparatus 2 through the communication section 14.

The storage section 12 is, for example, a memory device, and configured to retain programs that are to be executed by the control section 11. Further, the storage section 12 operates as a work memory of the control section 11.

The operation section 13 includes a tiltable operating member 131, such as a joystick that is tilt operable. Further, the operation section 13 may include other operation members such as a push button or a locking button. The operation section 13 outputs, to the control section 11, information indicating the operations performed on these operating members. For example, the tiltable operating member 131 outputs, to the control section 11, information regarding the tilt angle in the X-axis and Y-axis directions that are predetermined and perpendicular to each other. Further, the tiltable operating member 131 may be capable of being pushed. In such a case, information indicating the amount of push is additionally outputted to the control section 11.

Figure 2:
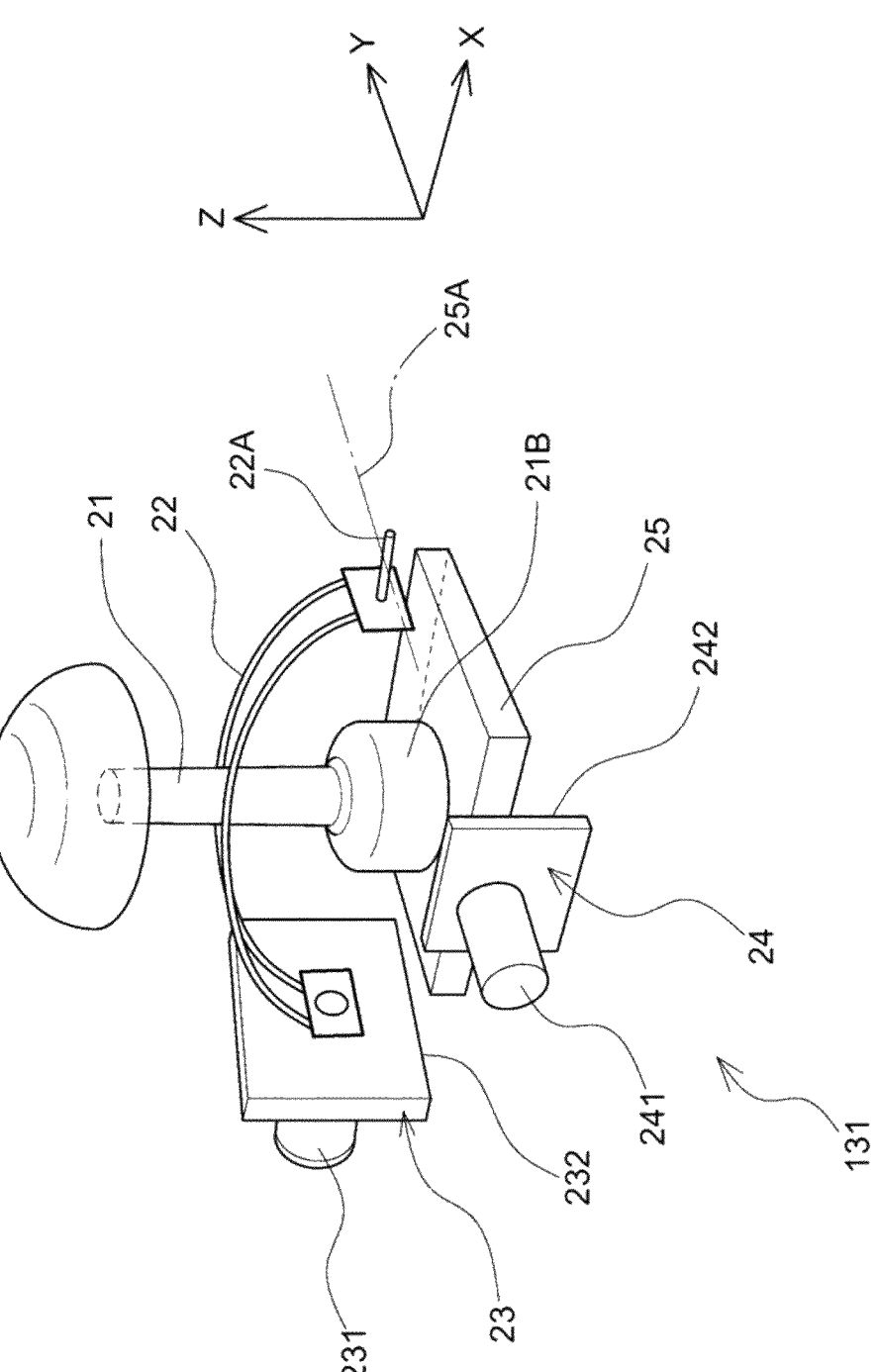
FIG. 2 is a schematic configuration diagram illustrating an example of a tiltable operating member included in the controller apparatus according to the embodiment of the present invention.

In an example of the present embodiment, as schematically illustrated in FIG. 2, the tiltable operating member 131 includes a columnar body 21, a guide 22, a first actuator 23, a second actuator 24, and a base 25. The columnar body 21 is tilt operable. Here, it is assumed that the guide 22 and the base 25 are rotatably supported around axes 22A and 25A, respectively, at least within a predetermined angle range, and that the direction of the axis 22A is the X-axis while the direction of the axis 25A is the Y-axis. It is also assumed that the direction perpendicular to both the X-axis and the Y-axis is the Z-axis. That is, the guide 22 rotates in the YZ plane around the axis 22A. Further, the base 25 rotates in the XZ plane around the axis 25A.

The guide 22 restricts the direction of movement of the columnar body 21 to one direction (X-axis direction). As described above, the guide 22 is supported so as to be rotatable in the YZ plane around the axis 22A within the predetermined angle range. It is assumed that this angle range includes an angle range in which the columnar body 21 is parallel to the Z-axis direction.

The first actuator 23 includes a motor 231 and a sensor 232. The motor 231 is, for example, a three-phase (having 3n (n is a natural number) stators) brushless DC motor, and configured to supply a current inputted from the drive section 15, which will be described later, to stator coils of individual phases in order to control the amount, speed, and direction of rotation of a rotor. The rotation shaft of the rotor of the motor 231 is coupled to the axis 22A of the guide 22, and the motor 231 rotates the guide 22 in the YZ plane around the axis 22A.

The sensor 232 is an angle sensor, such as a rotary encoder or a potentiometer, and configured to sequentially detect the tilt angle θc of the axis 22A of the guide 22 with a predetermined reference direction (e.g., the direction of the guide 22 in a state where the columnar body 21 can be oriented in the positive direction of the Z-axis) set to 0 degrees, and outputs the result of detection to the drive section 15.

The second actuator 24 includes a motor 241 and a sensor 242. As is the case with the motor 231, the motor 241 is, for example, a three-phase brushless DC motor, and configured to supply a current inputted from the drive section 15, which will be described later, to stator coils of individual phases in order to control the amount, speed, and direction of rotation of a rotor. The rotation shaft of the rotor of the motor 241 is coupled to the axis 25A of the base 25, and the motor 241 rotates the base 25 in the XZ plane around the axis 25A.

The sensor 242 is an angle sensor, such as a rotary encoder or a potentiometer, and configured to sequentially detect the tilt angle φc of the axis 25A of the base 25 with a predetermined reference direction (e.g., the direction of the base 25 in a state where the columnar body 21 can be oriented in the positive direction of the Z-axis) set to 0 degrees, and outputs the result of detection to the drive section 15. The first and second actuators 23 and 24, which are described above, correspond to the drive section of the present invention.

The base 25 is supported so as to be rotatable around the axis 25A at least within a predetermined angle range. Further, the base 25 supports a basal portion 21B of the columnar body 21 in such a manner that the columnar body 21 faces in the positive direction of the Z-axis when the rotation angle around the axis 25A is 0 degrees.

The communication section 14 is, for example, a wired interface, such as a USB (universal serial bus) interface, or a wireless interface, such as a Bluetooth (registered trademark) interface, and is connected to the information processing apparatus 2 so as to be able to communicate with the information processing apparatus 2 in a wired or wireless manner. The communication section 14 receives, from the information processing apparatus 2, a control instruction for controlling the drive section 15, and outputs the received control instruction to the drive section 15. Further, the communication section 14 receives, from the drive section 15, the tilt angle θc of the axis 22A of the guide 22, which is detected by the sensor 232 of the first actuator 23, and the tilt angle φc of the axis 25A of the base 25, which is detected by the sensor 242 of the second actuator 24, and transmits information indicating such detection results to the information processing apparatus 2.

Furthermore, in accordance with an instruction inputted from the control section 11, the communication section 14 transmits, for example, information indicating a user operation performed on the operation section 13 to the information processing apparatus 2 through the communication section 14.

Figure 3:
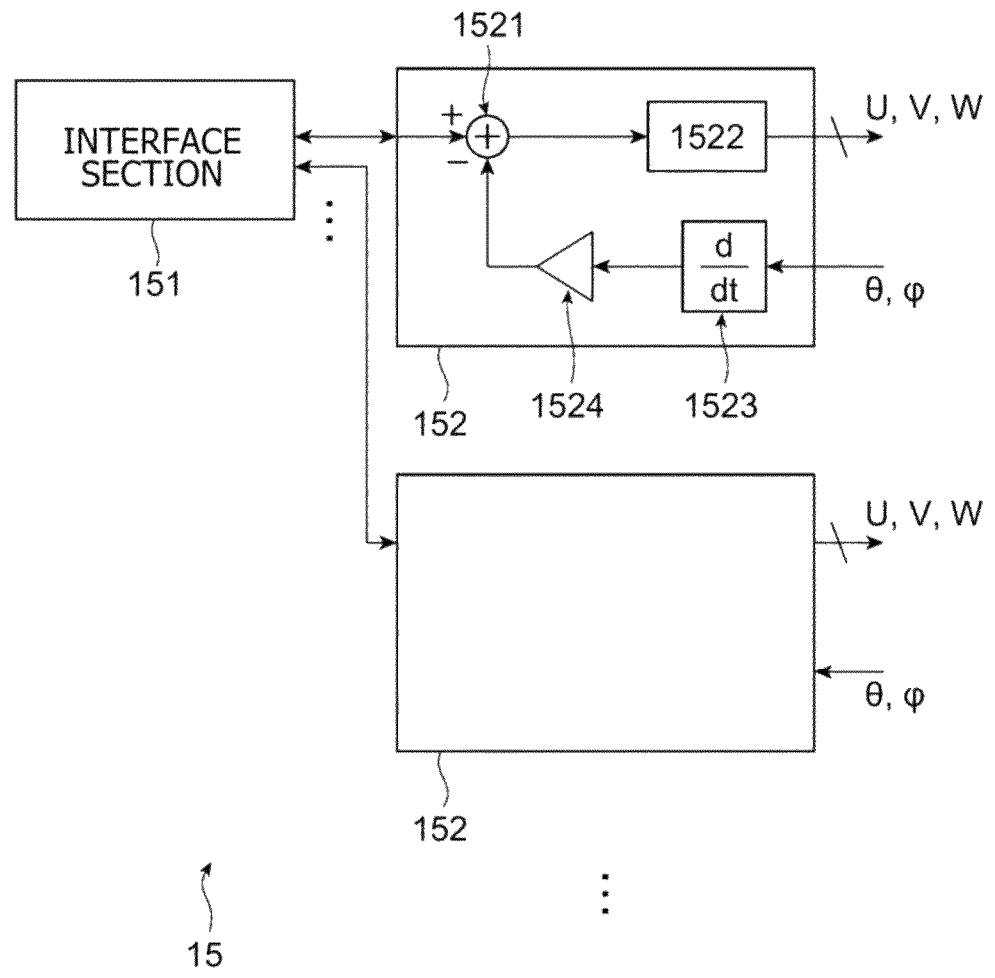
FIG. 3 is a schematic diagram illustrating an outline configuration of a drive section of the controller apparatus according to the embodiment of the present invention.

The drive section 15, which is a motor driver, includes an interface section 151 and current control sections 152 as illustrated in FIG. 3.

The interface section 151 implements the reception circuit of the present invention. The interface section 151 outputs, to the current control sections 152, control instructions inputted from the communication section 14. Here, in an example of the present embodiment, it is assumed that the motors 231 and 241 included in the first actuator 23 and the second actuator 24, respectively, are both brushless DC motors. In this example, it is assumed that the control instructions outputted from the information processing apparatus 2 are the amounts of current Idref and Iqref in the rotation coordinates of the motor 231 and motor 241, respectively. In the example of the present embodiment, it is assumed that Iqref is used to provide position control, and that Idref is fixed to "0."

Further, the interface section 151 receives the tilt angle θc of the axis 22A of the guide 22, which is detected by the sensor 232 of the first actuator 23, and transmits the result of detection to the communication section 14. Furthermore, the interface section 151 receives the tilt angle φc of the axis 25A of the base 25, which is detected by the sensor 242 of the second actuator 24, and transmits the result of detection to the communication section 14.

The current control sections 152 implement the control circuit of the present invention. The current control sections 152 are individual controllers that control the individual actuators, and are provided for the first and second actuators 23 and 24. As illustrated in FIG. 3, the current control sections 152 each include an adder 1521, a vector control section 1522, a differentiator 1523, and a multiplier 1524. Here, the adder 1521, the differentiator 1523, and the multiplier 1524 function as a damper. One of the features of the present invention is that the component elements functioning as the damper are disposed immediately before the vector control section and other component elements configured to control the actuators equipped, for example, with a motor.

The adder 1521 corrects the value Iqref of the amount of current supplied to the motor of the corresponding actuator, which is indicated by the control instruction inputted from the interface section 151, by subtracting the corresponding output value Iqmp of the multiplier 1524, which will be described later. It should be noted that, as already described, Idref is set to "0" here. Therefore, no correction is made to Idmp. However, in a case where control is exercised in such a manner that Idref is not set to "0," Idref is also corrected by subtracting Idmp.

The vector control section 1522 converts the value Iqref-Iqmp of the corrected amount of current, which is outputted from the adder 1521, into voltage values Vu, Vv, and Vw to be inputted to U-, V-, and W-phases, respectively, and outputs the resulting voltage values to the corresponding actuators (generally-called vector control). In this instance, the vector control section 1522 also separately measures the current values Iu, Iv, and Iw of the individual phases, and inversely transforms the measured current values into current values Iq and Id in the q-axis and d-axis directions for feedback control. Incidentally, in a case where Idref is used, Idref-Idmp and Iqref-Iqmp are each converted into the voltage values Vu, Vv, and Vw to be inputted to the U-, V-, and W-phases, and outputted to the corresponding actuators.

The differentiator 1523 time-differentiates the output value (present tilt angle) of the corresponding sensor 232 or 242. Specifically, the differentiator 1523 stores the last inputted output values $\theta c(t-1)$, $\varphi c(t-1)$ of the sensor 232 or 242, and determines and outputs the corresponding differences $\Delta\theta=\theta c(t)-\theta c(t-1)$ and $\Delta\varphi=\varphi c(t)-\varphi c(t-1)$ between the last inputted output values $\theta c(t-1)$, $\varphi c(t-1)$ of the sensor 232 or 242 and the currently-inputted output values $\theta c(t)$, $\varphi c(t)$ of the sensor 232 or 242.

The multiplier 1524 outputs a value Iqmp (and Idmp when Idref is used) that is obtained by multiplying the output value of the differentiator 1523 by a predetermined coefficient (damping factor). This damping factor is an example of a parameter for control provided by the present invention. In the present embodiment, unintended fluctuations are suppressed by subtracting the amount of current that is equivalent to the output value of the multiplier 1524. This damping factor may be determined experimentally or may be set by the information processing apparatus 2 as already described.

Figure 4:
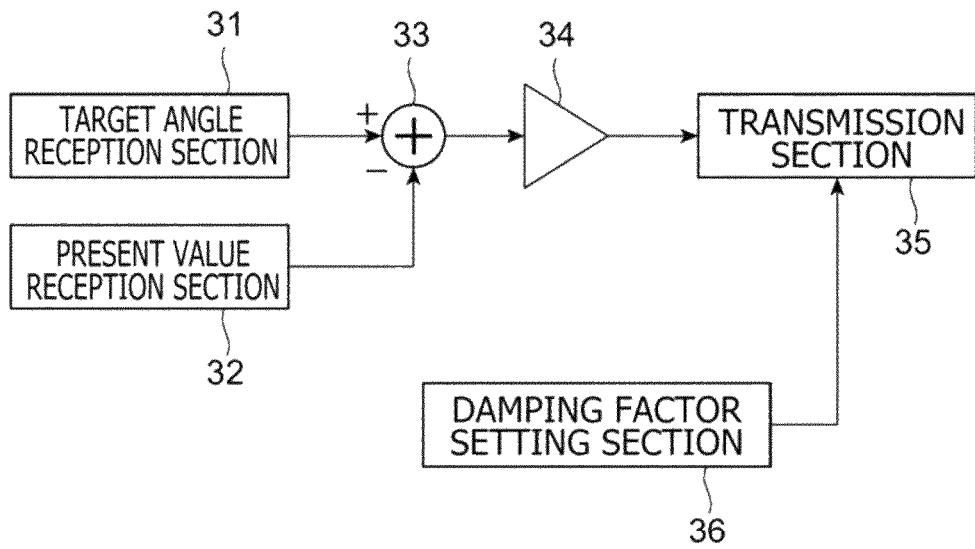
FIG. 4 is a schematic diagram illustrating a functional configuration of an information processing apparatus connected to the controller apparatus according to the embodiment of the present invention.

An example of a control instruction generation process performed by the information processing apparatus 2 will now be described. In an example of the present embodiment, the information processing apparatus 2 processes a game or other program to implement a configuration that functionally includes a target angle reception section 31, a present value reception section 32, an addition section 33, a rigidity control section 34, and a transmission section 35, as illustrated in FIG. 4. Additionally, in the present embodiment, the information processing apparatus 2 may functionally include a damping factor setting section 36.

The target angle reception section 31 receives an input of the setting of the tilt angle of the columnar body 21 of the tiltable operating member 131 of the controller apparatus 1, which is determined during the processing of a game or other program. The setting of this tilt angle is specified by the tilt angle $\theta$target of the axis 22A of the guide 22 and the tilt angle $\varphi$target of the axis 25A of the base 25.

The present value reception section 32 receives, from the communication section 14 of the controller apparatus 1, the tilt angle $\theta c$ of the axis 22A of the guide 22, which is detected by the sensor 232 of the first actuator 23, and the tilt angle $\varphi c$ of the axis 25A of the base 25, which is detected by the sensor 242 of the second actuator 24. The results of detection of the tilt angles $\theta c$ and $\varphi c$ are received after a certain amount of time has elapsed between the time of detection and the time of reception by the information processing apparatus 2 by means of communication. To indicate such a situation, information regarding the detection results received by the present value reception section 32 is hereinafter denoted as $\theta c\_delay$ and $\varphi c\_delay$.

The addition section 33 subtracts the corresponding detection result information, which is received by the present value reception section 32, from the information regarding the tilt angles $\theta$target and $\varphi$target, which is received by the target angle reception section 31, in order to calculate $\theta'target=\theta target-\theta c\_delay$ and $\varphi'target=\varphi target-\varphi c\_delay$, and outputs the results of calculations.

The rigidity control section 34 generates a control instruction Iqref by multiplying an output of the addition section 33 by a coefficient (rigidity factor) for a predetermined rigidity. The transmission section 35 transmits the control instruction Iqref, which is generated by the rigidity control section 34, to the controller apparatus 1. Incidentally, in this instance, it should be noted that Idref=0. However, in a case where Idref is also used, the rigidity control section 34 generates control instructions Idref and Iqref by multiplying the outputs of the addition section 33 by a coefficient (rigidity factor) for a predetermined rigidity, and causes the transmission section 35 to transmit the generated control instructions Idref and Iqref to the controller apparatus 1.

Further, in a case where the information processing apparatus 2 additionally includes the damping factor setting section 36, the damping factor setting section 36 transmits the value of the damping factor, which is determined during the processing of a game or other program, or a predetermined value of the damping factor to the controller apparatus 1 through the transmission section 35.

[Operation]

The controller apparatus 1 according to the present embodiment basically has the above-described configuration and operates in a manner described below. The following description relates to an example in which the information processing apparatus 2 sets the target tilt angles of the controller apparatus 1, namely, the target tilt angle of the axis 22A of the guide 22 and the target tilt angle of the axis 25A of the base 25, to 0 degrees (i.e., the angle that returns the columnar body 21 of the tiltable operating member 131 to the origin position). Incidentally, in the following description, it is assumed that Idref is fixed to "0."

Figure 5:
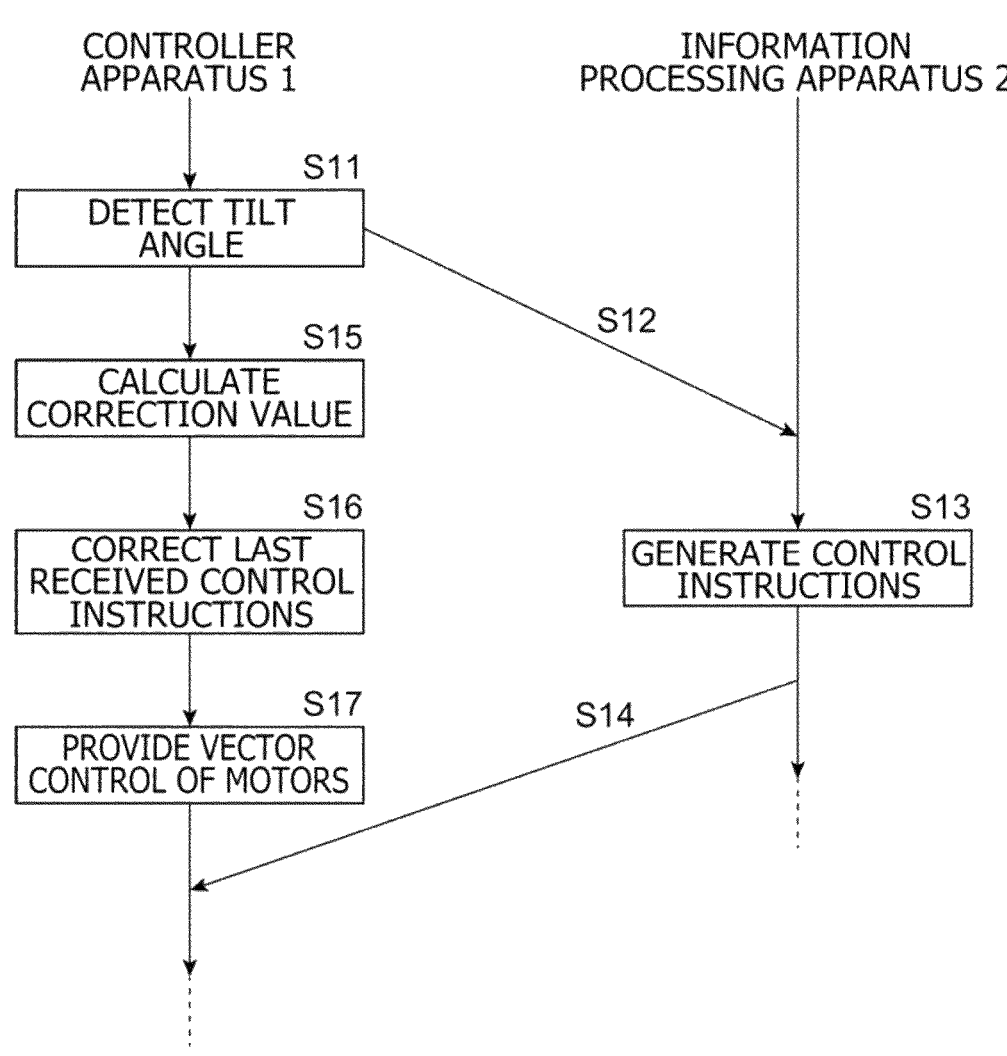
FIG. 5 is a flowchart illustrating an example of the operation of the controller apparatus according to the embodiment of the present invention.

In the above-mentioned example, as illustrated in FIG. 5, the sensor 232 of the first actuator 23 of the controller apparatus 1 sequentially detects the tilt angle $\theta c$ of the axis 22A of the guide 22, and the sensor 242 of the second actuator 24 sequentially detects the tilt angle $\varphi c$ of the axis 25A of the base 25 (step S11). Subsequently, the controller apparatus 1 transmits the information regarding these tilt angles $\theta c$ and $\varphi c$ to the information processing apparatus 2 with a predetermined delay (step S12).

The information processing apparatus 2 receives, from the controller apparatus 1, the tilt angle θc_delay of the axis 22A of the guide 22 and the tilt angle φc_delay of the axis 25A of the base 25, which are detected last by the controller apparatus 1 (step S12), and calculates θ'target=−θc_delay and φ'target=−φc_delay by using the tilt angles to be set (θtarget=0 and φtarget=0 in the present example) and the tilt angle θc_delay of the axis 22A of the guide 22 and the tilt angle φc_delay of the axis 25A of the base 25, which are received from the controller apparatus 1. Further, the information processing apparatus 2 multiplies these calculated values by a predetermined rigidity factor to generate a control instruction I1$q$ref for tilting the axis 22A of the guide 22 and a control instruction I2$q$ref for tilting the axis 25A of the base 25 (step S13), and transmits the generated control instructions to the controller apparatus 1 (step S14).

Meanwhile, while the information processing apparatus 2 is performing steps S12 to S14, the controller apparatus 1 calculates the difference (differential value) between the information regarding the tilt angles θc and φc acquired in step S11 and the last detected corresponding tilt angle information, and multiplies the calculated differential value by the value of a predetermined damping factor to obtain an output value (correction value) Iqmp (step S15).

In the following, it is assumed that the correction value required by the drive section 15 provided in correspondence with the first actuator 23 of the controller apparatus 1 is I1$qmp$, and the correction value required by the drive section 15 provided in correspondence with the second actuator 24 of the controller apparatus 1 is I2$qmp$.

The controller apparatus 1 uses the above correction values to correct the control instructions I1$d$ref and I1$q$ref that are received last from the information processing apparatus 2 (step S16).

More specifically, the controller apparatus 1 corrects the control instruction I1$q$ref to I1$q$ref−I1$q$ and corrects the control instruction I2$q$ref to I2$q$ref−I2$q$.

Subsequently, the controller apparatus 1 individually converts the value I1$q$ref−I1$q$, which indicates the corrected amount of current, into voltage values V1$u$, V1$v$, and V1$w$, which are to be inputted to the U-, V-, and W-phases of the motor 231 of the first actuator 23, respectively, and applies the resulting voltages to the stator coils of the respective phases of the motor 231 (step S17). In this instance, the controller apparatus 1 also converts the value I2$q$ref−I2$q$, which indicates the amount of current obtained in step S16, into voltage values V2$u$, V2$v$, and V2$w$, which are to be inputted to the U-, V-, and W-phases of the motor 241 of the second actuator 24, respectively, and applies the resulting voltages to the stator coils of the respective phases of the motor 241.

The above-described operation is performed to control the motors 231 and 241 by using a widely-known vector control method. Therefore, the adopted control method will not be described in detail here.

Further, the controller apparatus 1 receives the control instructions I1$q$ref, I2$q$ref from the information processing apparatus 2 (step S14) and uses the received control instructions for subsequent processing. The controller apparatus 1 and the information processing apparatus 2 repeatedly perform the above-described processing.

As described in the above example, the present embodiment is configured such that the drive section 15 of the controller apparatus 1 calculates the differential value of the results of detection by the sensors 232 and 242, and uses the calculated differential value to determine the amount of current to be supplied to the stator coils of the individual phases of the motors 231 and 241. More specifically, the drive section 15 uses the results of detection by the sensors 232 and 242 with a relatively short delay for a purpose of controlling the motors 231 and 241, respectively, and corrects the previous control instructions without waiting for control instructions based on the same detection result. This provides stable drive control of operating members.

Further, even after the tilt angle of the axis 22A of the guide 22 and the tilt angle of the axis 25A of the base 25 reach their respective target tilt angles, the amount of current corresponding to a temporal change (differential value) in each tilt angle is calculated with a relatively short delay in order to control the motors 231 and 241 accordingly and maintain each tilt angle at the target tilt angle. As a result, even if the columnar body 21 vibrates when a user flicks the columnar body 21 with his/her fingers, the vibration is suppressed relatively quickly.

[Modifications]

Incidentally, in the foregoing description, it is assumed that brushless DC motors are used as the actuators for controlling the tilt angle of the tiltable operating member. However, the actuators need not always be brushless DC motors. Different types of motors may be used as the actuators so long as they are able to control the direction and speed of rotation or the amount of rotation. Even in a case where such different types of motors are used as the actuators, the time differential of the present rotation angles of the motors is calculated immediately before an input current is supplied to the motors, and the amounts of current to be supplied to the motors are corrected according to the magnitude of the time differential in order to suppress unintended fluctuations with a relatively short delay.

REFERENCE SIGNS LIST

1: Controller apparatus
2: Information processing apparatus
11: Control section
12: Storage section
13: Operation section
14: Communication section
15: Drive section
21: Columnar body
22: Guide
23: First actuator
24: Second actuator
25: Base
31: Target angle reception section
32: Present value reception section
33: Addition section
34: Rigidity control section
35: Transmission section
36: Damping factor setting section
131: Tiltable operating member
151: Interface section
152: Current control section
231, 241: Motor
232, 242: Sensor
1521: Adder
1522: Vector control section
1523: Differentiator
1524: Multiplier

The invention claimed is:

1. A controller apparatus configured to be connected to an information processing apparatus, the controller apparatus comprising:

an operating member that is tilt operable;

a drive section configured to drive the operating member;

a reception circuit configured to receive, from the information processing apparatus, an input of instruction information indicating a driving direction and a driving angle of the operating member to be driven by the drive section; and a control circuit configured to control the drive section in accordance with the instruction information received by the reception circuit, wherein the control circuit configured to acquire information indicating a tilt angle of the operating member, calculate a differential value of the tilt angle, correct an electric current signal based on the calculated differential value of the tilt angle of the operating member, and control the drive section according to the corrected electric current signal.

2. The controller apparatus according to claim 1, wherein the control circuit is configured to correct the electric current signal using a predetermined damping factor and the differential value of the tilt angle of the operating member.

3. The controller apparatus according to claim 2, wherein to correct the electric current signal, the control circuit is configured to generate a correction signal by multiplying the calculated differential value by the predetermined damping factor, and correct the electric current signal by subtracting the generated correction signal from the electric current signal.

4. The controller apparatus according to claim 1, wherein the operating member comprises a columnar body, a guide, a first actuator, a second actuator, and a base.

5. The controller apparatus according to claim 4, wherein the guide and the base are rotatably supported about respective axes.

6. The controller apparatus according to claim 4, wherein the guide is configured to restrict a direction of movement of the columnar body to one direction.

7. The controller apparatus according to claim 4, wherein the first actuator comprises a first sensor which is configured to detect a tilt angle of the guide, and the second actuator comprises a second sensor which is configured to detect a tilt angle of the base.

8. The controller apparatus according to claim 4, wherein the first actuator and the second actuator are brushless DC motors.

9. The controller apparatus according to claim 1, wherein the control circuit comprises an adder, a vector control section, a differentiator, and a multiplier.

10. The controller apparatus according to claim 9, wherein the adder, the differentiator, and the multiplier function as a damper configured to suppress unintended fluctuations.

11. The controller apparatus according to claim 1, wherein the control circuit is further configured to convert the corrected electric current signal into a voltage signal and control the drive section using the voltage signal.

12. A method performed by a controller apparatus configured to be connected to an information processing apparatus, the controller apparatus comprising an operating member that is tilt operable, the method comprising:

receiving from the information processing apparatus, an input of instruction information indicating a driving direction and a driving angle of the operating member;

acquiring information indicating a tilt angle of the operating member;

calculating a differential value of the tilt angle;

correcting an electric current signal based on the calculated differential value of the tilt angle of the operating member;

outputting the corrected electric current signal; and driving the operating member according to the corrected electric current signal.

13. The method according to claim 12, wherein correcting the electric current signal comprises correcting the electric current signal using a predetermined damping factor and the differential value of the tilt angle of the operating member.

14. The method according to claim 13, further comprising:

generating a correction signal by multiplying the calculated differential value by the predetermined damping factor; and correcting the electric current signal by subtracting the generated correction signal from the electric current signal.

15. The method according to claim 12, further comprising:

converting the corrected electric current signal into a voltage signal; and driving the tilt operable operating member using the voltage signal.

16. The method according to claim 12, wherein the operating member comprises a columnar body and a guide, and the guide is configured to restrict a direction of movement of the columnar body to one direction.

17. A non-transitory, computer-readable storage medium having instructions stored thereon, the instructions, when executed, cause a control apparatus to perform operations comprising:

receiving, from an information processing apparatus, an input of instruction information indicating a driving direction and a driving angle of a tilt operable operating member;

acquiring information indicating a tilt angle of the operating member;

calculating a differential value of the tilt angle;

correcting an electric current signal based on the calculated differential value of the tilt angle of the operating member;

outputting the corrected electric current signal; and driving the operating member according to the corrected electric current signal.

18. The computer-readable storage medium according to claim 17, wherein correcting the electric current signal comprises correcting the electric current signal using a predetermined damping factor and the differential value of the tilt angle of the operating member.

19. The computer-readable storage medium according to claim 18, further comprising:

generating a correction signal by multiplying the calculated differential value by the predetermined damping factor; and correcting the electric current signal by subtracting the generated correction signal from the electric current signal.

20. The computer-readable storage medium according to claim 17, further comprising:

converting the corrected electric current signal into a voltage signal and driving the operating member using the voltage signal.

* * * * *